United States Patent [19]

Takura et al.

[11] Patent Number: 4,480,203
[45] Date of Patent: Oct. 30, 1984

[54] STEPPING MOTOR

[75] Inventors: Toshiyasu Takura, Hino; Tsuneaki Okada, Kawasaki; Eiji Kaneko, Tokyo, all of Japan

[73] Assignee: Tokyo Electric Co., Ltd., Tokyo, Japan

[21] Appl. No.: 454,667

[22] Filed: Dec. 30, 1982

[51] Int. Cl.³ .............................................. H02K 37/00
[52] U.S. Cl. ..................................... 310/42; 310/49 R
[58] Field of Search .................. 310/49, 162–165, 310/42, 194

[56] References Cited

U.S. PATENT DOCUMENTS

| 4,112,319 | 9/1978 | Field | 310/49 |
| 4,186,316 | 1/1980 | Singh | 310/49 |
| 4,186,322 | 1/1980 | Besson | 310/49 X |
| 4,209,719 | 6/1980 | Schädlich | 310/42 |
| 4,234,808 | 11/1980 | Geppert et al. | 310/49 |
| 4,385,250 | 5/1983 | Welburn | 310/49 X |

Primary Examiner—Donovan F. Duggan
Attorney, Agent, or Firm—James E. Nilles

[57] ABSTRACT

A stepping motor in which a rectangular stator core in the shape of a square frame has poles in the center of the inner side edges of sides thereof, four coils are wound on the poles of stator core, and a rotor is disposed in the space surrounded with the coils and having the height of each of poles being made 0.24 to 0.5 times as much as the outside diameter of the rotor. Each of poles has at the end thereof a plurality of projections according to a step angle. The rotor has projections on the peripheral surface thereof according to the step of the pole.

5 Claims, 33 Drawing Figures

FIG. 10
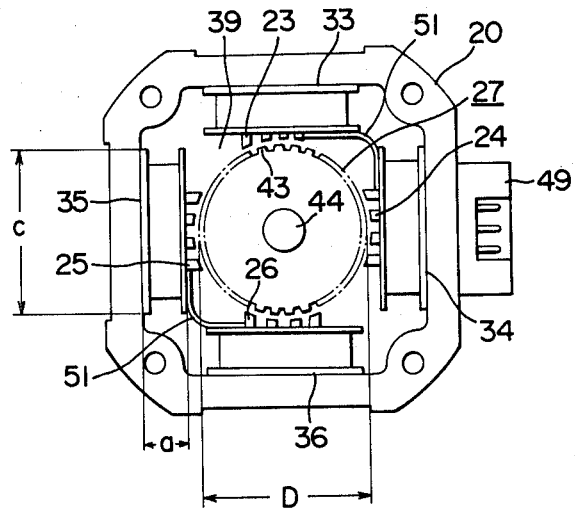
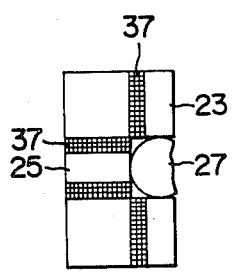
FIG. 11(a)
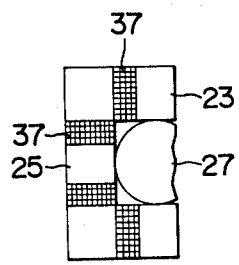
FIG. 11(b)
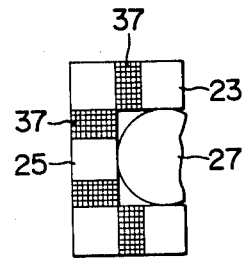
FIG. 11(c)
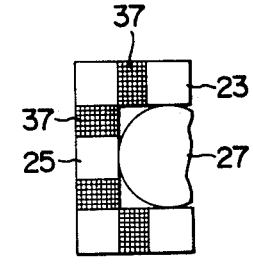
FIG. 11(d)
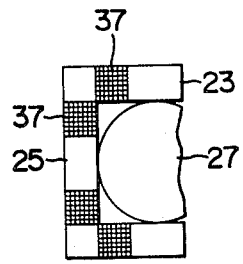
FIG. 11(e)
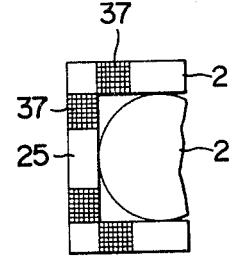
FIG. 11(f)
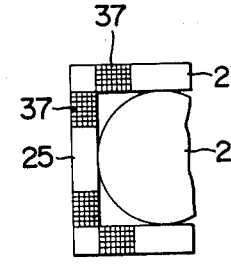
FIG. 11(g)
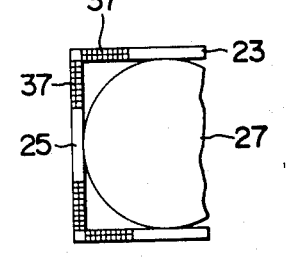
FIG. 11(h)

STEPPING MOTOR

BACKGROUND OF THE INVENTION

1. Field of the Invention

The present invention relates to a stepping motor and more particularly to an arrangement for mounting a coil wound on a bobbin to each of four poles formed on a stator core of a rectangular hybrid stepping motor.

2. Description of the Prior Art

Many conventional permanent magnet hybrid mini-angle stepping motors are of such a type as having a step angle of 1.8° or 3.6°. The arrangement of the stepping motors of the type mentioned above is such that, as shown in FIG. 1, eight poles 2 are formed projecting at symmetrical positions along the inner peripheral edge of a core 1, each pole 2 being wound with a coil. In this arrangement, if the outer shape of the core 1 is rectangular, there is a portion 3 at each of the corners which does not function as a core. Moreover, there is provided a smaller slit area for winding a coil between adjacent poles 2, since the eight poles 2 are projected from the inner peripheral edge of the core. Furthermore, since the poles 2 are directed toward the center of the core 1, there is provided a narrower gap 5 between the ends of the adjacent poles 2 as an opening of each of slit portions 4 for winding a coil. Accordingly, it is difficult to wind a coil on each pole 2, so that the workability is not good, resulting in not only a higher cost but also incapability of increase in production.

Therefore, a stepping motor employing a rectangular core with a substantially square shape has been proposed, such as stated in a U.S. Pat. No. 4,234,808. This stepping motor is arranged such that, as shown in FIG. 2, each of poles 9 is projected from the inner side edge 8 of each of sides 7 of a substantially square core 6 in order to enlarge the gap between each pair of adjacent poles 9 thereby facilitating winding of a coil. In the stepping motor of the type mentioned above, however, no consideration is taken at all for the relationship between the height of each pole of the core and the outside diameter of a rotor. Therefore, the stepping motor has a shortcoming that the coil winding amount with respect to the core is smaller and consequently, the electric loading is smaller, resulting in a smaller torque. Moreover, the conventional stepping motor shown in FIG. 2 has another shortcoming of bad workability in mounting a coil, since the stepping motor employs a method wherein a coil conductor coated with an insulation film is annularly wound on each pole 9 of the core 6 or an arrangement such that an insulation cylinder split into two is fitted on each pole 9 and wound with a coil conductor.

Further, in the conventional stepping motor shown in FIG. 2, a plurality of projections formed at the ends of some poles in the poles 9 each projected from the inner side edge 8 of each side 7 of the core 6 are offset sideways from the widthwise center of the corresponding side 7 according to a step angle in connection with the projections formed on the periphery of the rotor and a step angle. Therefore, each pole 9 having the projection offset sideways from the widthwise center of the corresponding side 7 is not formed so as to be symmetrical with respect to the widthwise center of the inner side edge 8 of the corresponding side 7, so that the pole 9 is offset sideways from the widthwise center of the side 7. Accordingly, when a coil 10 is wound on the pole 9, a useless space 11 is formed on the side opposite to the side to which the pole 9 is offset. Such tendency is particularly remarkable in the case where the number of the projections of the rotor corresponding to a step angle is odd. In such a case, the coil winding amount with respect to the core is reduced. Accordingly, the conventional stepping motor shown in FIG. 2 has a shortcoming of a smaller electric loading as well as a smaller torque correspondingly.

Furthermore, the stepping motor shown in FIG. 2 has still another shortcoming of a poor assembly workability because of such an arrangement that each coil 10 is wound on the corresponding pole 9 of the core 6 through an insulation sheet, so that it is troublesome to mount the coils 10.

Furthermore, the conventional stepping motor having each pole projected from the inner side edge of a rectangular stator core, as shown in FIG. 2, has such a shortcoming that a magnetic saturation takes place at the pole portions of the core, and particularly when an axial magnetic leakage occurs, a magnetically adverse effect is exerted on the apparatus incorporating the motor.

SUMMARY OF THE INVENTION

An object of the invention is to provide a stepping motor in which the above-mentioned shortcomings have been resolved.

According to the invention, the height of each of the poles projected from the inner side edge of the corresponding one of sides of the rectangular stator core with a substantially square frame shape is made 0.24 to 0.5 times as much as the outside diameter of the rotor so that when the height of each pole is 0.5 times as much as the outside diameter of the rotor the space capable of housing a bobbin is maximum and on the other hand, when the height of each pole formed on a core with the same size as above is 0.24 times as much as the outside diameter of the rotor, torque is maximum, thereby allowing a most efficient mechanical output to be obtained.

Moreover, according to the invention, since a bobbin wound with a coil is fitted on each pole projected from the inner side edge of the corresponding side of the core, and since the thickness of each bobbin is made substantially equal to the distance between the line extending from the end of the corresponding pole and perpendicular to the projecting direction of the pole and the adjacent side edge of the pole adjacent to the first-mentioned pole and moreover, since the width of the bobbin is made substantially equal to the value obtained by subtracting a value twice as large as the thickness of the bobbin from the distance between the inner side edges of the opposed sides of the core, it is possible to simultaneously mount coil bobbins on each pair of poles facing each other. Accordingly, workability in mounting bobbins is improved. Moreover, the electric loading is made comparatively large in accordance with the size of the core, thereby allowing a stepping motor with a larger torque to be obtained.

Furthermore, according to the invention, since the width of each bobbin wound with a coil is made substantially equal to the gap between the ends of the poles facing each other and since the thickness of the bobbin is made substantially equal to the length of each pole from the side edge to the end thereof as well as smaller than the outside diameter of the above-mentioned rotor, insertion of a coil bobbin in the space formed between the ends of the adjacent poles of the core allows the coil bobbin to be fitted on each pole. Accordingly, it is possible to speedily mount a coil on each pole, thereby improving the assembly workability.

Furthermore, according to the invention, since the side edge of each of the poles, which have projections at their respective ends made offset according to a step angle, in the poles each projected from the center of the inner side edge of the corresponding side of the rectangular stator core is cut so as to be parallel to the widthwise center line of the pole, and since the recess adjacent to the projection on the cut side is made offset toward the widthwise center line of the pole, it is possible to reduce the space produced in mounting of a coil owing to the asymmetrical arrangement of each pole. Accordingly, the coil winding amount can be made large as compared with the core, so that it is possible to obtain a larger torque.

Furthermore, according to the invention, since a terminal pin connected with a terminal of each coil is projected from the coil bobbin which is wound with the coil and fitted on each of the poles of the rectangular stator core and the terminal pin is connected to a wiring board, being inserted therethrough, the bobbin fitted on each pole of the core is positioned and held by the wiring board. Accordingly, the coils can be easily connected, and there is no fear of any wiring error. Moreover, connection defect can be prevented, and there is improvement in assembly.

Furthermore, according to the invention, a shield plate is disposed on the outer surface of one of frames, which are disposed on both surfaces of the stator core respectively, where the output shaft part of a rotary shaft is projected, and the shield plate is provided with a base plate part brought into contact with the outer surface of the one frame, a projection formed projecting from the base plate part so as to correspond to the position of the corresponding pole of the stator core, and a projecting piece part formed extending from the projection along the corresponding pole and engaging with the other frame. Therefore, the pole portions of the stator core are covered with the shield plate, so that any magnetic flux leakage occurring at the poles is short-circuited. Particularly, the leakage of the magnetic flux concentrated on the output shaft part side is prevented by means of the projections and the projecting piece parts of the shield plate. Accordingly, it is possible to prevent leakage magnetic flux from affecting the apparatus incorporating the motor. Moreover, the shield plate can be easily mounted.

Other objects and features of the invention will be apparent from the following description taken in connection with the accomapnying drawings.

BRIEF DESCRIPTION OF THE DRAWINGS

FIG. 9(a) through FIG. 9(p) illustrate the comparison between the height of each of poles of the core shown in FIG. 6 and the outside diameter of a rotor;

FIG. 10 is a bottom view of another stepping motor in accordance with the invention in the state where a lower frame is removed; and FIG. 11(a) through FIG. 11(h) illustrate the comparison between the height of each of poles of a core of the stepping motor shown in FIG. 10 and the outside diameter of a rotor.

DESCRIPTION OF THE PREFERRED EMBODIMENTS

A preferred embodiment of the invention will be described hereinunder with respect to a stepping motor with four phases and a step angle $\theta$ of 3-3/14° and having a rotor with 28 projections formed on the peripheral surface thereof at equal distances.

Figure 4:
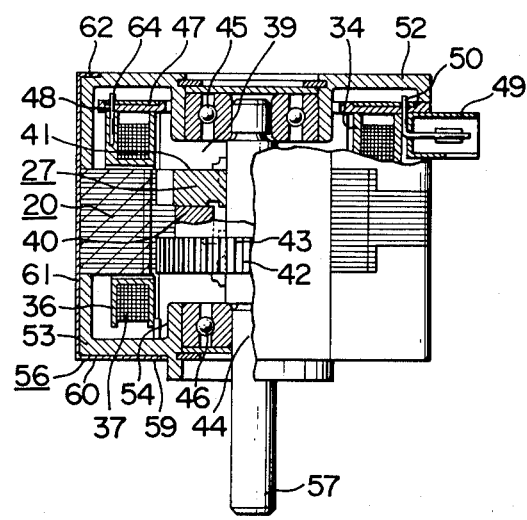
FIG. 4 is a partly-sectioned front elevational view of the stepping motor shown in FIG. 3.
Figure 5:
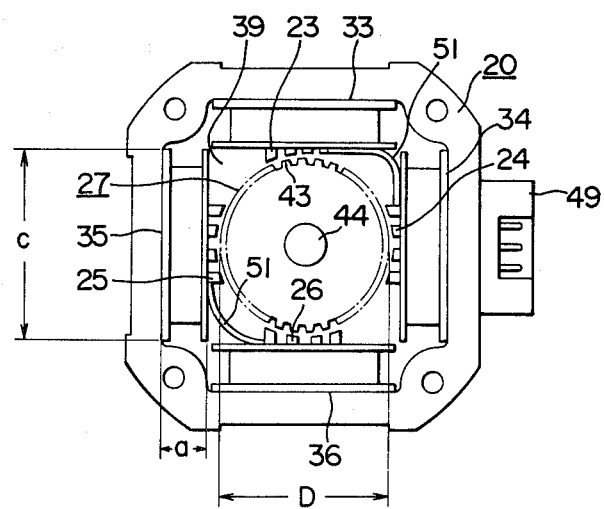
FIG. 5 is a bottom view of the stepping motor shown in FIG. 3 in the state where a lower frame is removed.
Figure 6:
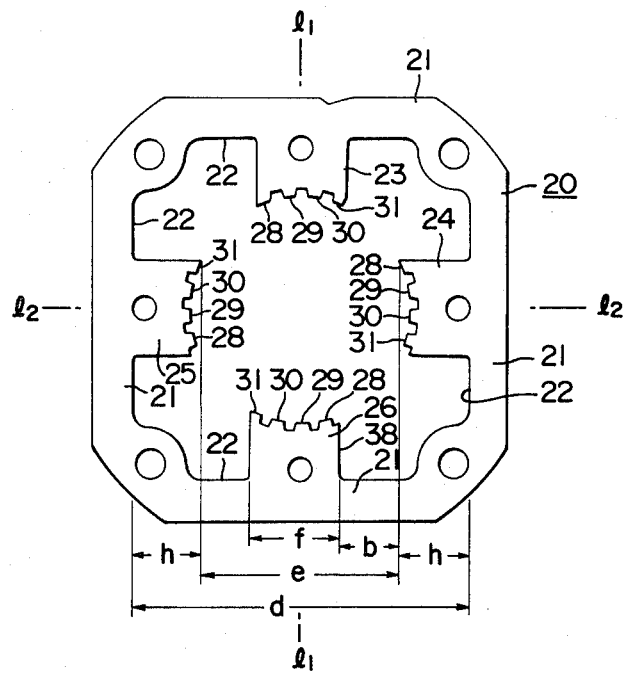
FIG. 6 is a plan view of a core of the stepping motor shown in FIG. 3.
Figure 7:
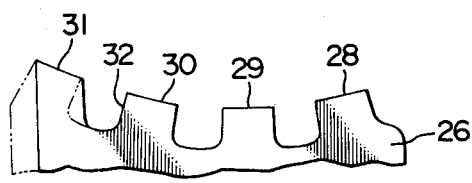
FIG. 7 is an enlarged view of a part of the core shown in FIG. 6.

A laminated or integrally formed stator core 20 is formed into a substantially square frame shape as shown in FIG. 6 and has each of poles 23, 24, 25, 26 projected from the substantially central portion of the inner side edge 22 of each of sides 21, 21, 21, 21. The height h of each of the poles 23, 24, 25, 26, from the inner side edge 22 of the corresponding side 21 to the end thereof, is made 0.24 to 0.5 times as much as the outside diameter D of a rotor 27, as described later. At the end edge of each of the poles 23, 24, 25, 26, four projections 28, 29, 30, 31 are formed in a tooth shape by notching the boundary between each corresponding pair of projections 28, 29, 30, 31. The first pole 23 has the four projections 28, 29, 30, 31 formed equally spacing in the central portion of the edge 22 so that the projections 28, 29, 30, 31 are bysymmetrical with respect to the vertical (as viewed in FIG. 6) center line $l_1$—$l_1$ of the core 20. On the other hand, the second pole 24 and the third pole 25, on the right and left sides as viewed in FIG. 6 respectively, have their respective four projections 28, 29, 30, 31 formed bysymmetrical with respect to the vertical center line $l_1$—$l_1$ of the core 20. The projections 28, 29, 30, 31 are formed being offset by a step angle $\theta°$ from the horizontal center line $l_2$—$l_2$ of the core 20 toward the first pole 23. Moreover, the fourth pole 26 facing the first pole 23 has the four projections 28, 29, 30, 31 formed being offset by an angle $2\theta°$ twice as much as the step angle $\theta°$ from the vertical center line $l_1$—$l_1$ toward the third pole 25. Further, the projections 28, 29, 30, 31 of each of the poles 23, 24, 25, 26 are formed toward the center of the core 20. The portion of each of the second pole 24 and the third pole 25 on the side of the first pole 23, together with the portion of the fourth pole 26, which is $2\theta°$ offset, on the side of the third pole 25 shown by chain lines in FIG. 7, are cut so as to be parallel to the center lines $l_2$—$l_2$, $l_1$—$l_1$. A recess 32 defining the projection 31 is made offset from the position shown by the chain lines toward the axial center of each of the poles 24, 25, 26, Next, bobbins 33, 34, 35, 36 wound with coils 37 respectively are adapted to be fitted on their respective poles 23, 24, 25, 26 of the core 20 as shown in FIGS. 4 and 5. The bobbins 33, 36 to be fitted on the first and fourth poles 23, 26 are wound with A and $\overline{A}$ phase coils 37 respectively in the bifilar winding manner, while the bobbins 34, 35 to be fitted on the second and third poles 24, 25 are wound with B and $\overline{B}$ phase coils 37 respectively in the bifilar winding manner.

The thickness a of each of the bobbins 33, 34, 35, 36 is made substantially equal to the distance between the line extending from the end of each of the poles 23, 24, 25, 26 and perpendicular to the projecting direction of the pole and the adjacent side edge of the corresponding one of the poles 23, 24, 25, 26 adjacent to the first-mentioned pole, e.g., a distance b between the vertical (as viewed in FIG. 6) line, which extends from the end of the second pole 24, and the side edge 38 of the fourth pole 26 on the side of the second pole 24. On the other hand, the width of each of the bobbins 33, 34, 35, 36 is made substantially equal to the value obtained subtracting the value twice as large as the thickness a of each of the bobbins 33, 34, 35, 36 from the distance d of each of the side 21 of the core 20 between the inner side edges 22.

Moreover, the width c of each of the bobbins 33, 34, 35, 36 is made substantially equal to the distance between the end edges of the poles facing each other, e.g., the distance e between the end edges of the second pole 24 and the third pole 25. In other words, the width c of each of the bobbins 33, 34, 35, 36 may be made substantially equal to the distance obtained by subtracting the sum of the heights h of the poles facing each other from the distance d between the inner side edges 22 of the core 20 facing each other, e.g., the distance e obtained by subtracting the sum of the heights 2h of the first pole 23 and the fourth pole 26 from the distance between the side edges 22 facing each other, while the thickness a of each of the bobbins 33, 34, 35, 36 may be made smaller than the outside diameter D of the rotor 27 described later as well as smaller than the height h of each of the poles 23, 24, 25, 26.

Next, the above-mentioned rotor 27 is disposed in a space 39 surrounded with the coils wound on the poles 23, 24, 25, 26 respectively as shown in FIG. 4. The rotor 27 is composed of a permanent magnet 40 and disk-shaped magnetic bodies 41, 42 provided sandwiching the permanent magnet 40. On the peripheral surface of each of the magnetic bodies 41, 42, 28 projections 43 are formed equally spacing. The projections 43 of the upper magnetic body 41 and those of the lower magnetic body 42 are circumferentially offset from each other by a half of one projection 43, i.e., a half of the step angle $\theta°$.

Moreover, a rotary shaft 44 secured to the central portion of the rotor 27, penetrating the same, is rotatably supported by bearings 45, 46 provided on frame 52, 53, respectively, as described later.

Furthermore, a terminal pin 64 connected with a lead wire of the coil 37 wound on each of the bobbins 33, 34, 35, 36 is connected to the upper side of each of the bobbins 33, 34, 35, 36, being inserted through a connection hole 48 of a printed-wiring board 47.

In addition, a terminal pin 50 of a connector 49 is connected to the wiring board 47.

Moreover, as shown in FIG. 5, both ends of a film-shaped coming-off prevention piece 51 are retained at least diagonal positions with respect to the bobbins 33, 34, 35, 36 fitted on their respective poles 23, 24, 25, 26 of the core 20, e.g., between the first pole 23 and the second pole 24 and between the third pole 25 and the fourth pole 26, in order to prevent each of the bobbins 33, 34, 35, 36 from coming-off.

Figure 1:
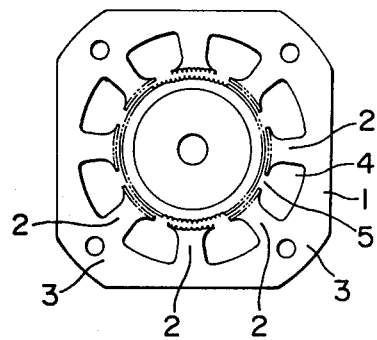
FIG. 1 is a plan view of a stator core of a conventional stepping motor.
Figure 2:
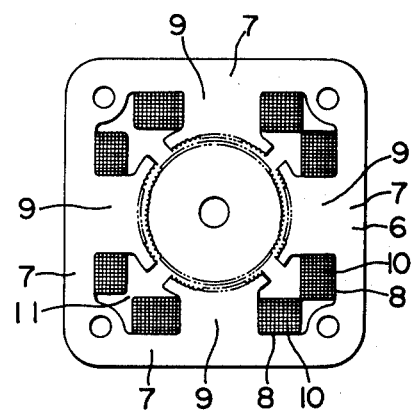
FIG. 2 is a plan view of a stator core of another conventional stepping motor.
Figure 3:
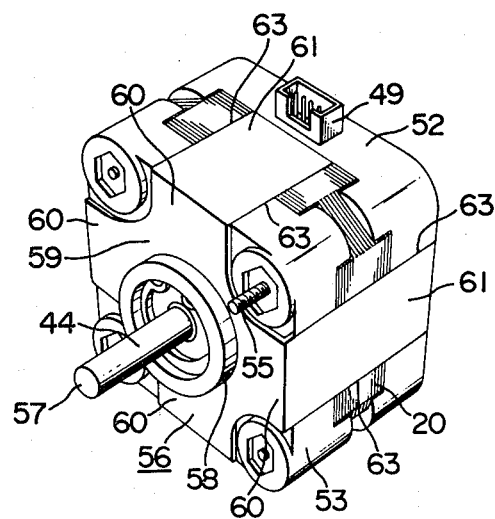
FIG. 3 is a perspective view of a stepping motor in accordance with a preferred embodiment of the invention.

Furthermore, motor frames 52, 53 shown in FIGS. 3 and 4 are adapted to be fitted on the upper and lower surfaces of the core 20.

Furthermore, the lower motor frame 53 has a holding projection 54 projected from the inner surface thereof and adapted to engage with the inner side of the lower side of each of the bobbins 33, 34, 35, 36. In the case where the wiring board 47 is not employed and a conductor is directly connected to the lead wire of each of the coils 37, the upper motor frame 52 is also provided with a projection projected from the inner surface thereof and adapted to engage with the inner surface of each of the bobbins 33, 34, 35, 36 in order to hold the movement of the corresponding one of the bobbins 33, 34, 35, 36. The upper and lower frames 52, 53 are fastened together by means of bolts 55 penetrating the core 20.

Figure 8:
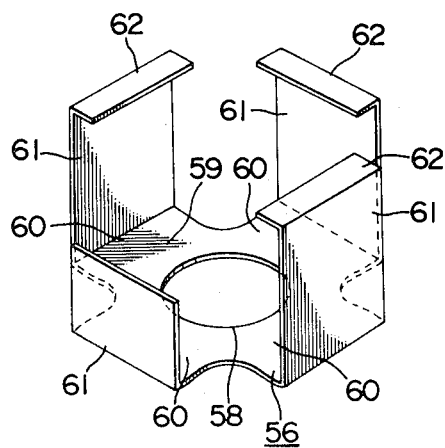
FIG. 8 is a perspective view of a shield plate of the core shown in FIG. 6.

Furthermore, a shield plate 56 shown in FIGS. 3 and 8, which is formed from a magnetic material such as iron plate, comprises: a base plate part 59 formed in a substantial cross shape and having in the center an insertion hole 58 for receiving an output shaft part 57 of the above-mentioned rotary shaft 44; a projecting piece part 61 extended from each of projections 60 of the base plate part 59 and bent; and an engaging piece part 62 extended from each of all the projecting piece parts 61 except for one projecting piece part 61 and bent. The base plate part 59 of the shield plate 56 is brought into contact with the outer surface of the lower frame 53, and each projecting piece part 61 is engaged with the corresponding one of engaging grooves 63 formed on the peripheral surfaces of the upper and lower frames 52, 53 and the core 20 correspondingly to the positions of the poles 23, 24, 25, 26. Moreover, the engaging piece parts 62 are engaged with engaging grooves 63 formed at the peripheral portions of the uppr outside surface of the upper frame 52 except for the position of the above-mentioned connector 49, thereby preventing magnetic leakage due to magnetic saturation at the pole 23, 24, 25, 26, particularly on the side of the output shaft part 57.

The operation of this embodiment will be described hereinunder.

First, when the A phase of each of the coils 37, 37 mounted on the first pole 23 and the fourth pole 26 respectively is excited, the first pole 23 is magnetized so as to be an S pole, while the fourth pole 26 is magnetized so as to be an N pole. In consequence, the first pole 23 attracts the projections 43 of the first magnetic body 41 of the rotor 27, while the fourth pole 26 attracts the projections 43 of the second magnetic body 42 of the rotor 27, causing the rotor 27 to rotate by the step angle $\theta°$. Next, when the B phase of each of the coils 37, 37 mounted on the second pole 24 and the third pole 25 respectively is excited, the second pole 24 is magnetized so as to be an N pole, while the third pole 25 is magnetized so as to be an S pole. Consequently, the second pole 24 attracts the projections 43 of the second magnetic body 42 of the rotor 27, while the third pole 25 attracts the projections 43 of the first magnetic body 41 of the rotor 27, causing the rotor 27 to rotate by the step angle $\theta°$. Next, when the $\overline{A}$ phase of the coils 37, 37 mounted on the first pole 23 and the fourth pole 26 respectively is excited, the first pole 23 is magnetized so as to be an N pole, while the fourth pole 26 is magnetized so as to be an S pole. In consequence, the first pole 23 attracts the projections 43 of the second magnetic body 42 of the rotor 27, while the fourth pole 26 attracts the projections 43 of the first magnetic body 41 of the rotor 27, causing the rotor 27 to rotate by the step angle $\theta°$. Next, when the $\overline{B}$ phase of each of the coils 37, 37 of the second pole 24 and the third pole 25 respectively is excited, the second pole 24 is magnetized so as to be an S pole, while the third pole 25 is magnetized so as to be an N pole. Consequently, the second pole 24 attracts the projections 43 of the first magnetic body 41 of the rotor 27, while the third pole 25 attracts the projections 43 of the second magnetic body 42 of the rotor 27, causing the rotor 27 to rotate by the step angle θ°. Then, this operation is repeated to allow the rotor 27 to rotate stepwise.

The leakage magnetic flux to concentrate on the side of the output shaft part 57 of the rotary shaft 44 due to the magnetic saturation taking place at each of the poles 23, 24, 25, 26 is prevented from leaking by the base plate part 59 and the projecting piece parts 61 of the shield plate 56.

Moreover, in the case where the thickness a of each of the bobbins 33, 34, 35, 36 is made substantially equal to the distance b between the line extending from the end of each of the poles 23, 26 and 24, 25 facing each other, respectively, and perpendicular to the projecting direction of the corresponding pole and the adjacent side edge of the pole adjacent to the first-mentioned pole and moreover, the width c of each of the bobbins 33, 34, 35, 36 is made substantially equal to the value obtained by subtracting the value twice as large as the thickness a of each of the bobbins 33, 34, 35, 36 from the distance d between the opposed inner side edges 22 of the sides 21 of the core 20, two sets of bobbins, each set comprising two bobbins, can be simultaneously fitted inside the core 20 and mounted on the corresponding poles facing each other.

In assembly, the terminal pin 64 projected from each of the bobbins 33, 34, 35, 36 is inserted through the connection hole 48 of the printed-wiring board 47 and soldered, thereby allowing the bobbins 33, 34, 35, 36 to be positioned and held as well as wiring to be simplified. Accordingly, there is no fear of any wiring error and moreover, it is possible to prevent a connection failure. In addition, connection of the connector 49 to the wiring board 47 permits a reliable connection of an external wiring.

Moreover, the bobbins 33, 34, 35, 36 are reliably secured simply by retaining both ends of the coming-off prevention pieces 51 each disposed between the corresponding pair of adjacent poles positioned on the diagonal line, e.g., between the side edges of the first pole 23 and the second pole 24 respectively and between the side edges of the third pole 25 and the fourth pole 26 respectively.

Furthermore, each holding projection 54 of the frame 53 fitted to the core 20 is engaged with the inner side of each of the bobbins 33, 34, 35, 36, thereby allowing the bobbins 33, 34, 35, 36 to be positioned.

Moreover, in the poles 23, 24, 25, 26 of the core 20, some of the poles 23, 24, 25, 26 with the centers θ° or 2θ° made offset have an end edge with the projection 31 on the offset side whose side edge is cut so as to be parallel to the central axis, and the recess 32 defining the projection 31 is offset toward the center, thereby to make it possible to reduce the space produced in mounting of the coils 37 owing to the asymmetrical arrangement of the poles 23, 24, 25, 26.

The relationship between the height h of each pole and the outside diameter D of the rotor will be described hereinunder in the case where the thickness a of each of the bobbins 33, 34, 35, 36, shown in FIGS. 5 and 6 is made substantially equal to the distance b between the line extending from the end of each of the poles 23, 24, 25, 26 facing each other and perpendicular to the projecting direction of the corresponding pole and the adjacent side edge of the pole adjacent to the first-mentioned pole and moreover, the width c of each of the bobbins 33, 34, 35, 36 is made substantially equal to the value obtained by subtracting the value twice as large as the thickness a of each of the bobbins 33, 34, 35, 36 from the distance d between the inner side edges 22 of the sides 21 facing each other.

If the distance d between the inner side edges 22 of the sides 21 of the core 20 facing each other is assumed to be 34 mm, and the ratio between the width f of each of the poles 23, 24, 25, 26 and the outside diameter D of the rotor 27 is assumed to be, e.g., 0.45, the housing area of a half of a coil housed between adjacent poles is such as shown in the following Table and FIG. 9(a) through FIG. 9(p).

| FIG. 9 | rotor outside diameter D mm | bobbin thickness a mm | bobbin width c mm | bobbin housing area S mm² | pole width f mm | product of bobbin housing area and rotor outside diameter |
|---|---|---|---|---|---|---|
| (a) | 11 | 3.0 | 11.5 | 34.8 | 5.0 | 383 |
| (b) | 13 | 3.6 | 10.5 | 37.5 | 5.9 | 488 |
| (c) | 15 | 4.1 | 9.5 | 39.2 | 6.8 | 588 |
| (d) | 16 | 4.4 | 9.0 | 39.6 | 7.2 | 634 |
| (e) | 17 | 4.7 | 8.5 | 39.7 | 7.7 | 676 |
| (f) | 18 | 5.0 | 8.0 | 39.6 | 8.1 | 713 |
| (g) | 19 | 5.2 | 7.5 | 39.2 | 8.6 | 745 |
| (h) | 20 | 5.5 | 7.0 | 38.5 | 9.0 | 770 |
| (i) | 21 | 5.8 | 6.5 | 37.5 | 9.5 | 788 |
| (j) | 22 | 6.8 | 6.1 | 36.3 | 9.9 | 799 |
| (k) | 23 | 5.5 | 6.3 | 34.8 | 10.4 | 800 |
| (l) | 24 | 5.0 | 6.6 | 33.0 | 10.8 | 792 |
| (m) | 25 | 4.5 | 6.9 | 30.9 | 11.3 | 773 |
| (n) | 26 | 4.0 | 7.2 | 28.6 | 11.7 | 744 |
| (o) | 28 | 3.0 | 7.7 | 23.1 | 12.6 | 647 |
| (p) | 30 | 2.0 | 8.3 | 16.5 | 13.5 | 495 |

It is to be noted that the height h of each of the poles 23, 24, 25, 26 is a half of the difference obtained by subtracting the outside diameter D of the rotor 27 from the distance d between the inner side edges 22 of the sides 21 of the core 20 facing each other as follows:

$$h = (34 - D) \div 2$$

As a result, it is apparent that the bobbin housing area S is maximum when the outside diameter D of the rotor 27 is 17 mm and the height h of each pole is 0.5 times as much as the outside diameter D of the rotor 27. At that time, the motor can have the largest electric loading in the motors employing the core 20 of the same size.

On the other hand, in order to allow the core to obtain the largest torque in the cores of the same size, it is only necessary to determine the outside diameter D of the rotor 27 so that the product of the bobbin housing area S proportional to electric loading and the outside diameter D of the rotor proportional to magnetic loading is maximum. As shown in the Table above, torque is maximum when the height h of each pole is 0.24 times as much as the outside diameter D of the rotor 27.

It is to be noted that although the ratio between the width f of each of the poles 23, 24, 25, 26 and the outside diameter D of the rotor 27 is assumed to be 0.45 in the Table above, the same is the case with the ratio of 0.3, 0.35, 0.4 or 0.5 as shown in the following Table.

| ratio between pole width f and rotor outside diameter D | rotor outside diameter D mm | bobbin thickness a mm | bobbin width c mm | bobbin housing area S mm² | pole width f mm | product of bobbin housing area and rotor outside diameter |
|---|---|---|---|---|---|---|
| 0.3 | 11 | 3.9 | 11.5 | 44.3 | 3.3 | 487 |
| 0.3 | 16 | 5.6 | 9.0 | 50.4 | 4.8 | 806 |
| 0.3 | 17 | 6.0 | 8.5 | 50.6 | 5.1 | 860 |
| 0.3 | 18 | 6.3 | 8.0 | 50.4 | 5.4 | 907 |
| 0.3 | 22 | 6.0 | 7.7 | 46.2 | 6.6 | 1016 |
| 0.3 | 23 | 5.5 | 8.1 | 44.3 | 6.9 | 1018 |
| 0.3 | 24 | 5.0 | 8.4 | 42.0 | 7.2 | 1008 |
| 0.3 | 30 | 2.0 | 10.5 | 21.0 | 9.0 | 630 |
| 0.35 | 11 | 3.6 | 11.5 | 41.1 | 3.9 | 452 |
| 0.35 | 16 | 5.2 | 9.8 | 46.8 | 5.6 | 749 |
| 0.35 | 17 | 5.5 | 8.5 | 47.0 | 6.0 | 798 |
| 0.35 | 18 | 5.9 | 8.0 | 46.8 | 6.3 | 842 |
| 0.35 | 22 | 6.0 | 7.2 | 42.9 | 7.7 | 944 |
| 0.35 | 23 | 5.5 | 7.5 | 41.1 | 8.1 | 946 |
| 0.35 | 24 | 5.0 | 7.8 | 39.0 | 8.4 | 936 |
| 0.35 | 30 | 2.0 | 9.8 | 19.5 | 10.5 | 585 |
| 0.4 | 11 | 3.3 | 11.5 | 38.0 | 4.4 | 417 |
| 0.4 | 16 | 4.8 | 9.0 | 43.2 | 6.4 | 691 |
| 0.4 | 17 | 5.1 | 8.5 | 43.4 | 6.8 | 737 |
| 0.4 | 18 | 5.4 | 8.0 | 43.2 | 7.2 | 778 |
| 0.4 | 22 | 6.0 | 6.6 | 39.6 | 8.8 | 871 |
| 0.4 | 23 | 5.5 | 6.9 | 38.8 | 9.2 | 873 |
| 0.4 | 24 | 5.0 | 7.2 | 36.0 | 9.6 | 864 |
| 0.4 | 30 | 2.0 | 9.8 | 18.0 | 12.0 | 540 |
| 0.5 | 11 | 2.8 | 11.5 | 31.6 | 5.5 | 348 |
| 0.5 | 16 | 4.0 | 9.0 | 36.0 | 8.0 | 576 |
| 0.5 | 17 | 4.3 | 8.5 | 36.1 | 8.5 | 614 |
| 0.5 | 18 | 4.5 | 8.0 | 36.0 | 9.0 | 648 |
| 0.5 | 22 | 5.5 | 6.0 | 33.0 | 11.0 | 726 |
| 0.5 | 23 | 5.5 | 5.8 | 31.6 | 11.5 | 727 |
| 0.5 | 24 | 5.0 | 6.0 | 30.0 | 12.0 | 720 |
| 0.5 | 30 | 2.0 | 7.5 | 15.0 | 15.0 | 450 |

As apparent from the Table above, in all the cases, the bobbin housing area S is maximum when the height h of the each pole is 0.5 times as much as the outside diameter D of the rotor 27, while torque is maximum when the height h of each pole is 0.24 times as much as the outside diameter D of the rotor 27.

Further, in the case where the width c of each bobbin shown in FIG. 10 is made substantially equal to the distance between the end edges of the poles facing each other and moreover, the thickness a of each bobbin is made smaller than the outside diameter D of the rotor as well as smaller than the height h of each pole, the relationship between the height h of each pole and the outside diameter D of the rotor is such as shown in the following Table and FIG. 11(a) through FIG. 11(h).

| FIG. 11 | rotor outside diameter D mm | bobbin thickness a mm | bobbin width c mm | bobbin housing area S mm² | pole width f mm | product of bobbin housing area and rotor outside diameter |
|---|---|---|---|---|---|---|
| (a) | 11 | 11.5 | 3.0 | 34.8 | 5.0 | 383 |
| (b) | 16 | 9.0 | 4.4 | 39.6 | 7.2 | 634 |
| (c) | 17 | 8.5 | 4.7 | 39.7 | 7.7 | 676 |
| (d) | 18 | 8.0 | 5.0 | 39.6 | 8.1 | 713 |
| (e) | 22 | 6.0 | 6.1 | 36.3 | 9.9 | 799 |
| (f) | 23 | 5.5 | 6.3 | 34.8 | 10.4 | 800 |
| (g) | 24 | 5.0 | 6.6 | 33.0 | 10.8 | 792 |
| (h) | 30 | 2.0 | 8.3 | 16.5 | 13.5 | 495 |

As apparent from the Table above, the bobbin housing area S is maximum when the height h of each pole is 0.5 times as much as the outside diameter D of the rotor 27, while torque is maximum when the height h of each pole is 0.24 times as much as the outside diameter D of the rotor 27.

It is to be noted that although the motor with a step angle θ° of 3-3/14° has been described in accordance with the above embodiment, the angle is not exclusive and another proper step angle can be employed, such as 1.8° or 3.6°.

Moreover, although the embodiment has been described with respect to the 4-phase 1-excitation system, the invention can be applied to the 4-phase 2-excitation system and the 4-phase and 1-2 excitation system.

What is claimed is:

1. A stepping motor comprising: a rectangular stator core in the shape of a substantially square frame having in the center of each of the inner side edges of the sides thereof the corresponding one of a plurality of poles each having at the end thereof a plurality of projections formed according to a step angle; four coils wound on bobbins fitted on said poles of said stator core and disposed along said inner side edges of said sides of said stator core, respectively; and a rotor disposed in the space surrounded by said coils and having projections formed on the peripheral surface thereof according to said step angle corresponding to said plurality of projections of said poles, wherein the height of each of said poles is made 0.24 to 0.5 times as much as the outside diameter of said rotor, the thickness of each of said bobbins being substantially equal to the distance between a line extending from the end of the corresponding one of said poles and perpendicular to the projecting direction thereof, and the adjacent side edge of the pole adjacent to said corresponding one of said poles, and the width of each of said bobbins being substantially equal to the value obtained by subtracting a value twice as large as the thickness of each of said bobbins from the distance between the inner side edges of said sides of said stator core facing each other.

2. A stepping motor as defined in claim 1, wherein the width of each of said bobbins having been wound with said coils, respectively, is made substantially equal to the distance between the ends of said poles facing each other and moreover, the thickness of each of said bobbins is made substantially equal to the projecting length of each of said poles from the side edge to the end thereof as well as smaller than the outside diameter of said rotor.

3. A stepping motor comprising: a rectangular stator core in the shape of a substantially square frame having in the center of each of the inner side edges of the sides thereof the corresponding one of a plurality of poles each having at the end thereof a plurality of projections formed according to a step angle; four coils wound on bobbins fitted on said poles of said stator core and disposed along said inner side edges of said sides of said stator core, respectively; and a rotor disposed in the space surrounded by said coils and having projections formed on the peripheral surface thereof according to said step angle corresponding to said plurality of projections of said poles, wherein the said edges of some of said poles whose end projections are offset according to said step angle are cut so that each of said side edges is parallel to the widthwise center line of the corresponding one of said poles and, moreover, a recess adjacent to the projection on the cut side is offset toward said widthwise center line.

4. A stepping motor comprising: a rectangular stator core in the shape of a substantially square frame having in the center of each of the inner side edges of the sides thereof the corresponding one of a plurality of poles each having at the end thereof a plurality of projections formed according to a step angle; four coils wound on bobbins fitted on said poles of said stator core and disposed along said inner side edges of said sides of said stator core, respectively; a rotor disposed in the space surrounded with said coils and having projections formed on the peripheral surface thereof according to said step angle corresponding to said plurality of projections of said poles; and a wiring board for connecting said coils, wherein a terminal pin connected with the terminal of each of said coils is projected from each of said bobbins wound with said coils respectively, and connected to said wiring board, being inserted therethrough.

5. A stepping motor comprising: a rectangular stator core in the shape of a substantially square frame having in the center of each of the inner side edges of the sides thereof the corresponding one of a plurality of poles each having at the end thereof a plurality of projections formed according to a step angle; four coils wound on bobbins fitted on said poles of said stator core and disposed along said inner side edges of said sides of said stator core, respectively; a rotor disposed in the space surrounded with said coils and having projections formed on the peripheral surface thereof according to said step angle corresponding to said plurality of projections of said poles, said rotor being provided with a rotary shaft having one end side thereof defined as an output shaft part; frames fitted on both sides of said stator core, respectively, one of said frames being adapted to allow said output shaft part of said rotary shaft to project; and a shield plate disposed on the outer surface side of said one of said frames allowing said output shaft part to project, wherein said shield plate is provided with a base plate part brought into contact with said outer surface of said one of said frames, a projection projected from said base plate part so as to correspond to the position of each of said poles, and a projecting piece part extended from said projection along the position of each of said poles and engaged with the other of said frames.

* * * * *